United States Patent [19]

Bricheno et al.

[11] Patent Number: 5,974,206
[45] Date of Patent: Oct. 26, 1999

[54] DISPERSION COMPENSATION WITH LOW POLARIZATION MODE DISPERSION

[75] Inventors: Terry Bricheno, Great Sampford; Gregory John Milner, Paignton; Alan Robinson, Harlow, all of United Kingdom

[73] Assignee: Northern Telecom Limited, Quebec, Canada

[21] Appl. No.: 08/993,944

[22] Filed: Dec. 19, 1997

[51] Int. Cl.⁶ .............................. G02B 6/00; G02B 6/34
[52] U.S. Cl. .................... 385/11; 385/27; 385/37
[58] Field of Search ................ 385/11, 15, 24, 385/27, 37

[56] References Cited

U.S. PATENT DOCUMENTS

| | | | |
|---|---|---|---|
| 4,953,939 | 9/1990 | Epworth | 350/96.19 |
| 5,048,909 | 9/1991 | Henry et al. | 385/27 |
| 5,093,876 | 3/1992 | Henry et al. | 385/28 |
| 5,404,413 | 4/1995 | Delavaux et al. | 385/15 |
| 5,446,578 | 8/1995 | Chang et al. | 359/282 |
| 5,828,681 | 10/1998 | Epworth | 372/20 |

FOREIGN PATENT DOCUMENTS

| | | | |
|---|---|---|---|
| 2161612 | 7/1984 | United Kingdom | H04B 9/00 |
| 2308461 | 6/1997 | United Kingdom | G02B 6/14 |
| WO97/22034 | 6/1997 | WIPO | G02B 27/28 |

OTHER PUBLICATIONS

"Low–loss fibre Bragg grating transmission filter based on a fibre polarisation splitter" Electronics Letters, vol. 30, No. 18, Sep. 1, 1994.
Electronics Letters Sep. 1, 1994, vol. 30 No. 18 M J Guy et al pp. 1512–1513 "Low–loss fibre Bragg grating transmission filter based on a fibre polarisation splitter".
Proceedings of First International Conference MIT, Nov. 9–11, 1981, p. 67 S Ezekiel and H J Arditty "Fiber–Optic Rotation Sensors".

*Primary Examiner*—Rodney Bovernick
*Assistant Examiner*—Victoria D. Hao
*Attorney, Agent, or Firm*—Lee, Mann, Smith, McWilliams, Sweeney and Ohlson

[57] ABSTRACT

A dispersion compensator exhibiting low polarisation mode dispersion is constructed from a polarisation beam-splitter, a $\pi/4$ rotation Faraday rotator, and a matched pair of polarisation maintaining fibres provided with a matched pair of chirped Bragg reflection gratings. The waveguides are oriented with respect to the beam-splitter so that light reaching the waveguides from the beam-splitter via the rotator is launched into both waveguides with a polarisation state aligned with the same polarisation axis (i.e. both fast or both slow).

14 Claims, 2 Drawing Sheets

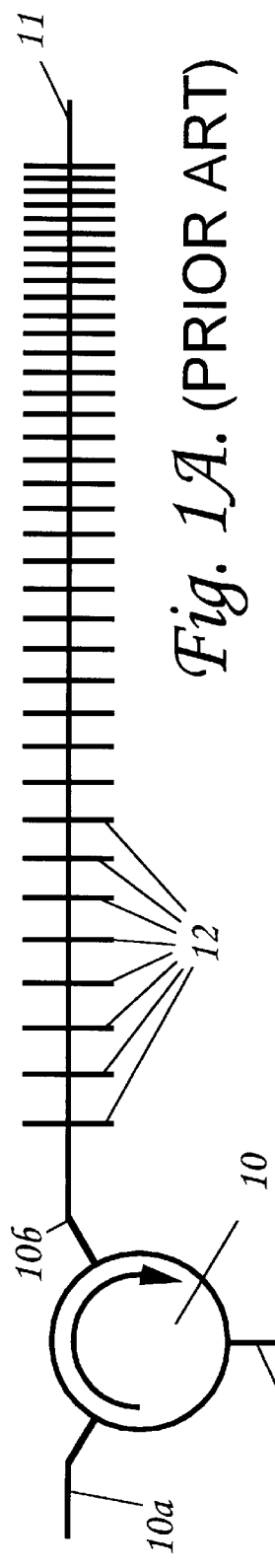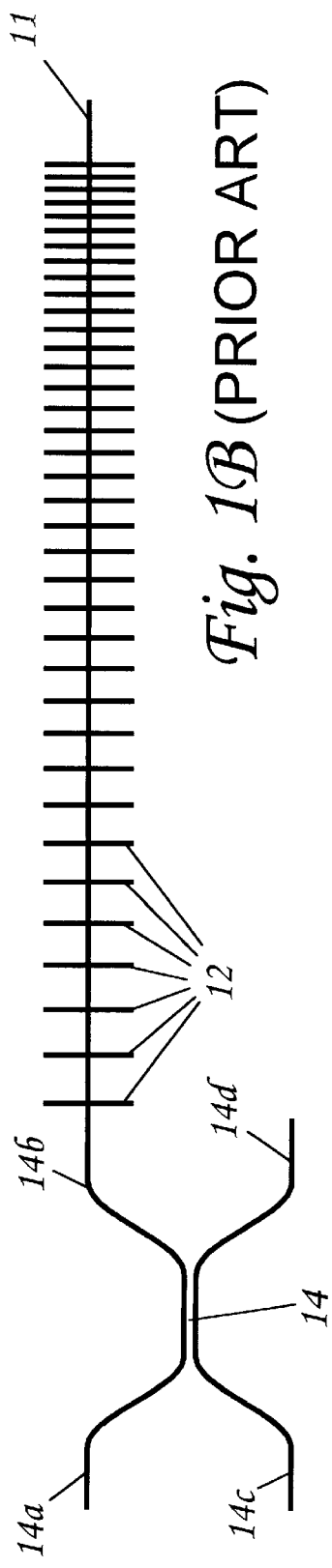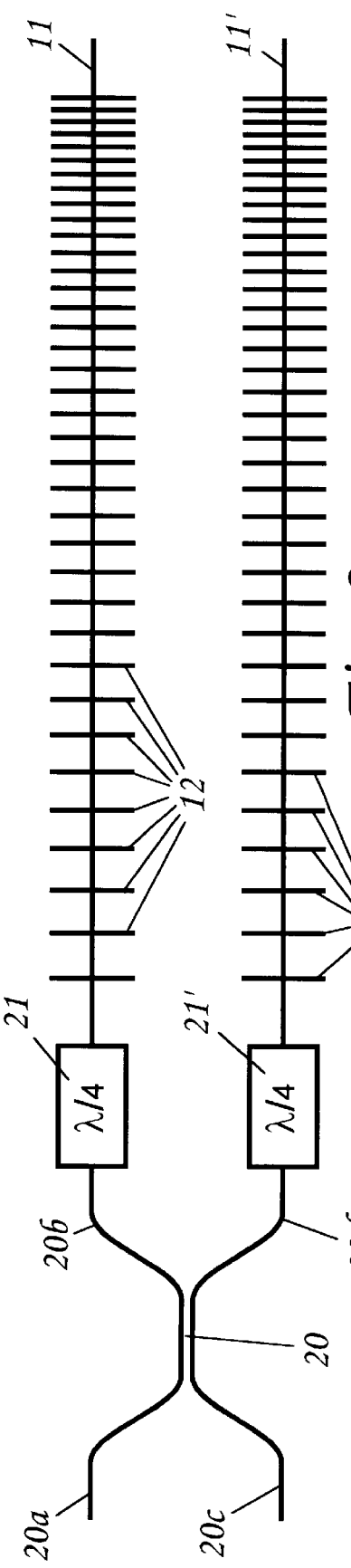

DISPERSION COMPENSATION WITH LOW POLARIZATION MODE DISPERSION

BACKGROUND OF THE INVENTION

The use of Bragg reflective gratings in optical fibre waveguides for waveguide dispersion compensation in optical fibre transmission systems has been described in GB 2 161 612 B. The dispersion compensator uses a chirped Bragg reflective grating in an optical waveguide connected to one port of a 3-port circulator or of a 2×2 3 dB directional coupler. Light is directed into one port of the circulator or 3 dB coupler from which it is launched into the waveguide with the chirped Bragg grating. The reflected light is launched back into the circulator or (3 dB coupler) to emerge from a different port. Conventional transmission fibre typically exhibits a dispersion zero at a wavelength in the region 1.3 $\mu$m, and therefore, for transmissions in the region of 1.5 $\mu$m, this fibre exhibits anomalous dispersion (i.e. longer wavelengths in the region of 1.5 $\mu$m suffer a longer transit time through the fibre than shorter wavelengths in this region). Accordingly, to achieve a measure of dispersion compensation, the Bragg grating should delay shorter wavelengths more than longer wavelengths, this by reflecting the longer wavelengths at distances closer to the circulator (or 3 dB coupler) than those at which the shorter wavelengths are reflected. In other words the large pitch end of the chirped Bragg grating reflector should face the circulator (or 3 dB coupler). The Bragg reflective grating based dispersion compensator that employs a 3-port circulator is depicted in FIG. 1A, while its counterpart that employs a 2×2 fused fibre 3 dB directional coupler is depicted in FIG. 1B. Referring to FIG. 1A, a 3-port circulator 10 has ports 10a, 10b, and 10c. Ports 10a and 10c constitute respectively the input and output ports of the dispersion equaliser. Port 10b is optically coupled with a chirped Bragg reflective grating 12. The dispersion equaliser of FIG. 1B is distinguished from that of FIG. 1A in that the place of the circulator 10 of the dispersion equaliser of FIG. 1A is taken by a 2×2 fused fibre 3 dB coupler 14 provided with ports 14a, 14b, 14c and 14d. Ports 14a and 14c constitute respectively the input and output ports of the dispersion equaliser. Port 14c is optically coupled with the waveguide 11, while port 14d is not used.

The dispersion equaliser of FIG. 1A may be preferred to that of FIG. 1B because the circulator 10 does not introduce the same intrinsic loss as the 3 dB coupler 14. When power is launched into output port 14a of coupler 14, there is a minimum of 3 dB loss because half of this power is directed to output port 14d, instead of to output port 14b, and so is wasted. Similarly, a further minimum of 3 dB loss occurs because half of the power reflected by the Bragg grating, instead of being direct into the output port 14c, is directed out of the input port 14a, and so is wasted. On the other hand a 3-port circulator is liable to be much more costly than a 3 dB fused fibre coupler.

The problem of the 6 dB extra loss involved in the use of the 3 dB coupler has been addressed by M J Guy et al in a report entitled, 'Low-loss fibre Bragg grating transmission filter based on a fibre polarisation splitter', Electronics Letters, Sep. 1, 1994, Volume 30, Number 18 pages 1512–3. In particular this report describes a way of avoiding the 6 dB loss penalty by a method involving the use of an optical fibre polarisation beam-splitter instead of a 3 dB coupler, the use of a second Bragg reflector optically coupled with the fourth port of the polarisation beam-splitter, and the use of two quarter wave birefringence elements. This arrangement is depicted in FIG. 2. Referring to FIG. 2, a polarisation beam-splitter 20 has ports 20a, 20b, 20c and 20d. Ports 20a and 20c constitute respectively the input and output ports of the dispersion equaliser. Light of any arbitrary state of polarisation (SOP) applied to input port 20a is resolved into orthogonal linearly polarised components respectively emerging by way of ports 20b and 20d. From these ports the light is launched via respective quarter-wave birefringence elements 21 and 21' into respective fibres 11 and 11' provided with identical chirped Bragg reflectors 12 and 12' optically substantially equidistant from the polarisation beam-splitter 20. The quarter-wave birefringence elements 21 and 21' are aligned such that the linearly polarised light from each of the ports 20b and 20d is launched into their respective fibre 11 and 11' as circularly polarised light. The light that is reflected by the respective gratings 12 and 12' is also circularly polarised, but now has the opposite handedness. Accordingly, after transmission back through birefringence element 21, the light being launched back into polarisation beam-splitter 20 by way of port 20b from fibre 11 is polarised orthogonally with respect to the SOP of the light that was launched from port 20b into fibre 11. Therefore this reflected light passes back through the polarisation beam-splitter 20 to emerge exclusively by way of port 20c. Similarly, after transmission back through birefringence element 21', the light launched back into polarisation beam-splitter 20 by way of port 20d from fibre 11' is polarised orthogonally with respect to the SOP of the light that was launched from port 20d into fibre 11'. Therefore this reflected light also passes back through the polarisation beam-splitter 20 to emerge exclusively by way of port 20c.

The foregoing analysis has failed to take any account of any birefringence that may be present in either of the fibres 11 and 11'. If there is any such birefringence, this will make the 'optical pitch', by which term is meant the product of the physical pitch with the effective refractive index, of any pair of Bragg reflecting elements of a Bragg grating different for the two different principal SOPs. The physical pitch is the same in both instances, but the presence of birefringence means that their effective refractive indices are necessarily different. This means that any particular part of the chirped grating will reflect a waveband centred on one wavelength for one of the principal SOPs, and will reflect a waveband centred on a slightly different wavelength for the other principal SOP. In other words, in the presence of birefringence in the waveguide in which the Bragg reflection grating is created, the reflection produced by that grating produces polarisation mode dispersion (PMD).

Polarisation maintaining optical waveguide has fast and slow axes defining, together with the waveguide axis, an orthogonal set of axes. The two planes that contain the waveguide axis and either the fast axis or the slow axis define principal planes, these having the property that light of a single wavelength plane polarised in a principal plane propagates in the waveguide with a single velocity. The velocity is greater for light propagating plane polarised in the principal plane containing the fast axis than for that plane polarised in the other principal plane (containing the slow axis). For light propagating with any other state of polarisation (SOP), this light is resolved into its principal plane components which, on account of their propagation with different velocities, give rise to the phenomenon of polarisation mode dispersion (PMD).

An idea of the scale of the problem of PMD in the Bragg reflection grating type dispersion compensators of an optical transmission system can be arrived at by considering a 10 Gbit/s system. The pulses in such a system are 100 ps wide. If there are a number of dispersion compensators in cascade along the transmission path, their PMD will be cumulative, and so the PMD of each may typically be required to be less than 1.0 ps. In a typical optical fibre, light will travel about 1 mm in 5 ps, and so, if Bragg grating of a dispersion compensator is written in birefringent fibre, the point along the grating at which one principal plane component of light of any chosen freespace wavelength is reflected should, taking into account the folded path, be separated by less than 0.1 mm from that at which the other principal plane component is reflected. If the grating is 2 meters long, is centred on a free-space wavelength of 1.5 µm, and covers a (freespace) spectral range of 30 nm, then the rate of change of pitch is 15 pm per mm. Under these conditions the proportional change in reflected wavelength over a 0.1 mm distance along the grating is 1 part in $10^6$. Therefore, for the Bragg grating not to induce more than 1.0 ps PMD, the proportional difference between the effective refractive indices of the two principal planes should not exceed 1 part in $10^6$.

As a practical matter, to make an optical fibre with a birefringence as low as this is not always an easy task because unintentionally introduced departures from perfect circular symmetry are very liable to introduce significant birefringence. With the exercise of due care, it is possible to make conventional transmission type optical fibre with birefringence lower than this. An example of a very low birefringence fibre of this sort may typically have a PMD in the region of 0.0005 ps/m, which corresponds to a birefringence index difference of about 1 part in $10^7$. However optical fibre designed for high photosensitivity suitable for having Bragg gratings written into it typically has a core/cladding index difference ($\Delta n$) greater than that of conventional transmission fibre (typically $\Delta n \approx 0.01$ instead of $\Delta n \approx 0.005$), and the greater index difference is found to exacerbate the non-circularity problem. Moreover there can be good reason for wanting to use fibre with an even higher $\Delta n$, typically fibre for which $\Delta n \approx 0.05$. A reason for this is that increasing $\Delta n$ provides a 'blue-shift' to the short wavelength loss exhibited by chirped Bragg reflective gratings. If $\Delta n$ is large enough, the blue-shift may be sufficient to take this loss, or at least a significant proportion of it, outside the operative wavelength band of the transmission system in which the dispersion compensator is to be located.

A fibre whose $\Delta n$ is about 0.05 is typically found to exhibit a birefringence of about 0.05 ps/m, making it a medium birefringence fibre with a beat length of about 10 cm. This corresponds to a birefringence index difference of about 1 part in $10^5$.

According to a theory developed by R Ulrich, 'Fiber-Optic Rotation Sensors & Related Technologies, Proceedings of the First International Conference' page 67, the phase shift per meter β introduced by bending an optical fibre of radius r into a curve of radius $R_c$ is given by $$\beta = 0.565 \times 10^6 (r/R_c) \text{ rads/m}$$

at a free-space wavelength $\lambda = 1.5$ µm. From this it can be shown that, for 125 µm diameter fibre, a bend radius of about 6 mm or less is required to cancel the birefringence of a fibre with a beat length of 10 cm, and so such fibre is polarisation maintaining fibre under normal operating conditions.

It is now seen that, though the dispersion equaliser of FIG. 2 does offer a way around the 6 dB loss penalty, it does this in a manner that ensures that any birefringence in fibres 11 and 11' is certain to introduce PMD into the system because light is propagating in these fibres as circularly polarised light.

SUMMARY OF THE INVENTION

An object of the present invention is the provision of dispersion equalisers that employ Bragg reflection gratings constructed in fibre that exhibits significant birefringence, and in which the PMD exhibited by such equalisers is low.

Low PMD is achieved by using a 4-port polarisation beam-splitter to resolve an input signal applied to the first port into two orthogonally polarised components appearing in the second and third ports. These are launched, via a non-reciprocal element, such as a Faraday rotator providing a π/4 rotation, into a matched pair of polarisation maintaining optical waveguides provided with matching chirped Bragg reflection gratings, each aligned so that the component is launched with its polarisation state substantially aligned with the same one (fast or slow) of the principal polarisation planes of that waveguide. Because of this alignment, and because the waveguide is polarisation maintaining, each wavelength of each component propagates in its associated waveguide without engendering any significant PMD. The light that is reflected in each waveguide by its Bragg grating makes a return passage through the non-reciprocal element, and so each reflected component re-enters the polarisation beam-splitter with the polarisation state that is orthogonally related with that with which the component originally left the polarisation beam-splitter. Accordingly both reflected components propagate back through the polarisation beam-splitter to appear recombined on the fourth port.

The transit from input by way of the first port to output by way of the fourth imports significant chromatic dispersion because different wavelengths propagate for different distances in the respective polarisation maintaining waveguides before being reflected. On the other hand, within a single polarisation maintaining waveguide, there is substantially no PMD because the light is launched into the waveguide polarised in substantial alignment with one of the principal polarisation planes of that waveguide. The matching of the waveguides and their Bragg gratings similarly minimises any PMD that could result from the combining of the reflected components by the polarisation beam-splitter.

The minimisation of PMD requires that each Bragg reflected wavelength of one of the orthogonally polarised components propagates in its associated waveguide for substantially the same time as the time the corresponding Bragg reflected wavelength of the other orthogonally polarised component propagates in its associated waveguide. This may conveniently be achieved as outlined above in which each component is launched into its associated polarisation maintaining waveguide with its polarisation state substantially aligned with the same one (fast or slow) of the principal polarisation planes of those respective waveguides. This may be found convenient because it means that the requisite equality of propagation times is achieved by the use of identical polarisation maintaining waveguides with identical chirped Bragg gratings. On the other hand it should be clearly understood that the requisite equality of propagation times can be achieved with the use of one fast principal polarisation plane and one slow, but in this instance equality of propagation times will require the fibres to have non-identical propagation characteristics, and/or the chirped Bragg gratings to be non-identical.

The polarisation maintaining waveguides with chirped Bragg reflection gratings are preferably optical fibre waveguides with a core/cladding refractive active index difference ($\Delta n$) which is large compared with that of conventional transmission type fibre.

Other features and advantages of the invention will be readily apparent from the following description of preferred embodiments of the invention, the drawings of the claims.

BRIEF DESCRIPTION OF THE DRAWINGS

FIGS. 1A, 1B, and 2 (to which previous reference has been made) are schematic illustrations of different forms of prior art optical chromatic dispersion compensator.

DETAILED DESCRIPTION OF THE PREFERRED EMBODIMENTS

Figure 3:
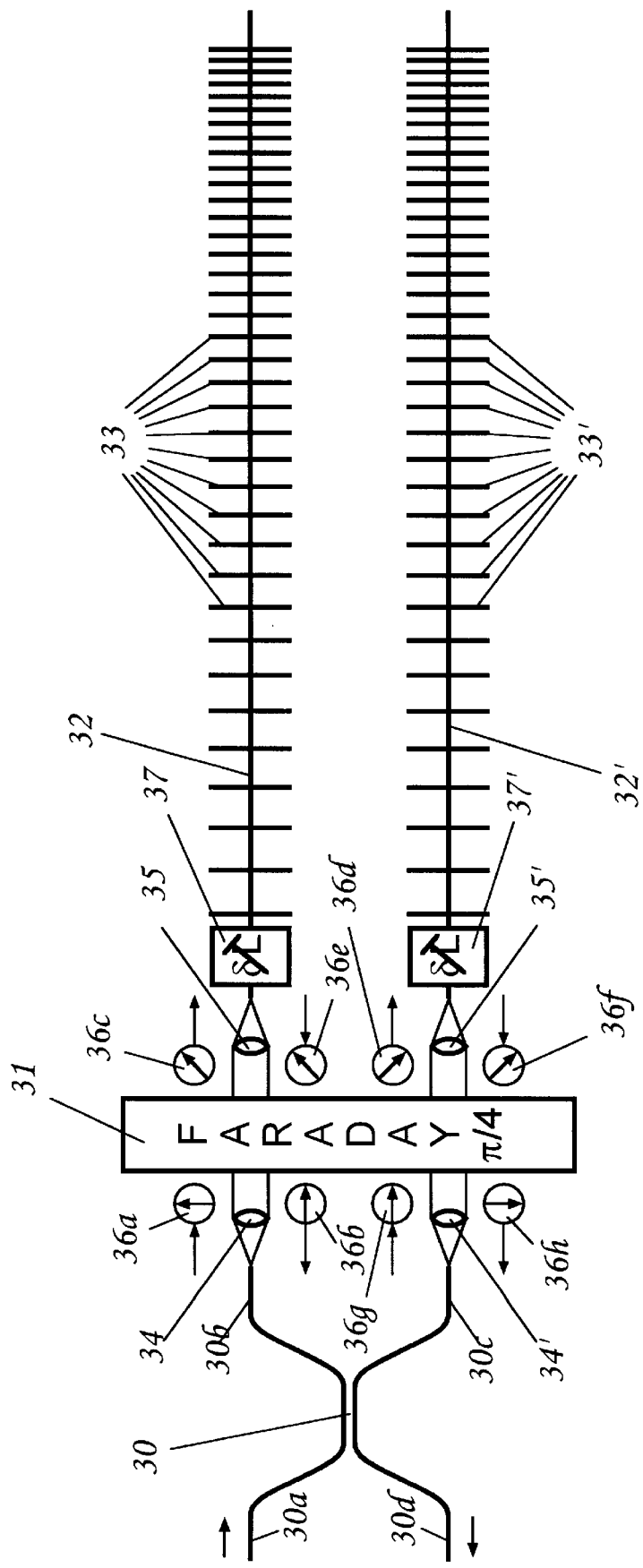
FIG. 3 is a schematic illustration of an optical chromatic dispersion compensator embodying the present invention in a preferred form.

Referring to FIG. 3, a Bragg reflective grating based dispersion compensator embodying the present invention in a preferred form employs a 4-port polarisation beam-splitter 30, a Faraday rotator 31, and a matched pair of polarisation maintaining optical fibre waveguides 32 and 32' provided with matching chirped Bragg reflection gratings 33 and 33'. The 4-port polarisation beam-splitter 30 has ports 30a, 30b, 30c and 30d and, though it could take the form of a bulk optics device, for convenience of illustration has been illustrated in the schematic form of a 2×2 optical fibre polarisation beam-splitter provided with collimating lenses 34 and 34' on ports 30b and 30c. Although illustrated as conventional lenses, these lenses will more typically be of the self-focusing graded index lens type. On the far side of the Faraday rotator 31 are a further pair of collimating lenses 35 and 35'. By means of these four lenses optical fibres 32 and 32' are optically coupled with ports 30b and 30c of the polarisation beam-splitter 30.

The polarisation beam-splitter 30 resolves an input signal applied to its port 30a into two orthogonal linearly polarised components emerging respectively from ports 30b and 30c. These two polarisation states are indicated by symbols 36a and 36b. The Faraday rotator 31 is a π/4 rotator, and so, when these components make a forward passage through this rotator from its side adjacent the polarisation beam-splitter 30 to its side adjacent the polarisation maintaining fibres 32 and 32', these polarisation states are converted to those indicated respectively by the symbols 36c and 36d. The polarisation maintaining fibres 32 and 32' are each oriented with a principal polarisation plane substantially aligned with the polarisation state being launched into it. In this way it is ensured that, in respect of any wavelength, the light launched into each fibre is not resolved into two components propagating with different velocities, but remains as a single component propagating with a single velocity.

The different spectral components of the light launched into each of the fibres 32 and 32' are reflected at different distances along their respective chirped gratings 33 and 33'. The rate of chirp determines the amount of chromatic dispersion thereby engendered. The fibres 32 and 32' are polarisation maintaining, and so, in respect of each fibre, the reflected light returns to the Faraday rotator 31 with the same polarisation state as that with which it originally left it, as indicated by polarisation state symbols 36e and 36f. In their return passage through the Faraday rotator the reflected components have their polarisation state rotated by π/4, and so emerge on the side nearer the polarisation beam-splitter with polarisation states as indicated respectively by symbols 36g and 36h. It will be noticed that polarisation states 36g and 36a are orthogonal, and similarly that polarisation states 36h and 36b are also orthogonal. Therefore the polarisation beam-splitter combines the two reflected components to emerge from port 30d.

The two fibres 32 and 32' are matching, and so are their chirped gratings 33 and 33'. Since the fibres are polarisation maintaining fibres, the effective pitch at any position along the grating, being the product of the physical pitch with the effective refractive index, for the principal polarisation plane containing the fast axis is not the same as that for the principal plane containing the slow axis. Accordingly the fibres 32 and 32' are oriented so that the light launched into both fibres is launched aligned with the principal plane containing the fast axis or so that the light launched into both fibres is launched aligned with the principal plane containing the slow axis. (Inspection of FIG. 3 reveals that, under the conditions, if the alignment is with the principal planes containing the fast axis for light launched into the system by way of port 30a, then the alignment is with the principal planes containing the slow axis for light launched into the system by way of port 30d). In this way it is ensured that physically matched chirped gratings produce matching chromatic dispersions. Then, in order to ensure that the recombination of the two reflected components does not introduce PMD, it is necessary to ensure that these two gratings are at equal optical path distance from the polarisation beam-splitter. This may conveniently be realised by the use of fine adjustment using optical path length trimmers 37 and 37'. Such trimming can conveniently be effected in an optical fibre by localised plastic stretching of it while in a heat-softened state using a microflame. At least in the initial stages of such stretching the proportional change in physical axial length is much greater than the proportional change in propagation constant, and so such stretching has the effect of increasing the optical path length.

It may be noticed that if the fibres 32 and 32' together with their chirped gratings 33 and 33' were replaced by a second polarisation beam-splitter, the apparatus would be converted from a dispersion compensator into a kind of circulator. It follows therefore that at least certain kinds of circulator can be modified, by the replacement of a polarisation beam-splitter with a matched pair of polarisation maintaining waveguides provided with matching chirped Bragg reflection gratings, so as to convert them into dispersion compensators exhibiting low PMD. A particular example of circulator suitable for this purpose is that described in WO 97/22034.

We claim:

1. A method of providing chromatic dispersion using Bragg reflection in polarisation maintaining optical waveguide, which method includes the steps of, separating an input optical signal into orthogonally polarised components, causing each separated component to make a forward passage through a non-reciprocal element, causing each component to suffer spatially distributed reflection as the result of being launched into an associated one of two polarisation maintaining optical waveguides, each to propagate in that associated waveguide with a polarisation state substantially aligned with a principal polarisation plane of that waveguide, that waveguide being provided with a chirped Bragg reflection grating the location and chirp of which is chosen, in relation to that of the Bragg grating of the other waveguide, such that each Bragg reflected wavelength of one separated component propagates in its associated waveguide for substantially the same time as the time the corresponding Bragg reflected wavelength of the other separated component propagates in its associated waveguide, causing each reflected component to make a return passage through the non-reciprocal element, and then recombining the two components.

2. A method as claimed in claim 1, wherein the non-reciprocal element is a Faraday rotator providing a $\pi/4$ rotation.

3. A method as claimed in claim 1, wherein the step of causing the separated components to suffer spatially distributed reflection as the result of being launched into said polarisation maintaining optical waveguides comprises launching the components into a pair of substantially identical polarisation maintaining waveguides with substantially identical chirped Bragg reflection gratings.

4. A method as claimed in claim 3, wherein the non-reciprocal element is a Faraday rotator providing a $\pi/4$ rotation.

5. A method as claimed in claim 1, wherein the non-reciprocal element is a Faraday rotator providing a $\pi/4$ rotation.

6. An optical device exhibiting chromatic dispersion, which device includes a 4-port polarisation beam-splitter optically coupled, via a non-reciprocal element, with two polarisation maintaining optical waveguides provided with respective chirped Bragg reflection gratings, wherein the polarisation beam-splitter has 1st, 2nd, 3rd and 4th ports and is coupled with the polarisation maintaining waveguides such that light launched into the polarisation beam-splitter via its 1st port is resolved into two orthogonally polarised components emerging respectively from the 2nd and 3rd ports to be launched, after propagation through the non-reciprocal element, into respective ones of the two polarisation maintaining waveguides, each with a polarisation state substantially aligned with a principal polarisation plane of the polarisation maintaining waveguide into which it is launched, and wherein the location and chirp of the Bragg grating of each of the two polarisation maintaining waveguides is related to that of the other such that each Bragg reflected wavelength of one separated component propagates in its associated waveguide for substantially the same time as the time the corresponding Bragg reflected wavelength of the other separated component propagates in its associated waveguide.

7. An optical device as claimed in claim 6, wherein the non-reciprocal element is a Faraday rotator providing a $\pi/4$ rotation.

8. An optical device as claimed in claim 6, wherein said polarisation maintaining optical waveguides are substantially identical polarisation maintaining waveguides with substantially identical chirped Bragg reflection gratings.

9. An optical device as claimed in claim 6, wherein the polarisation maintaining optical waveguides are optical fibre waveguides with a core/cladding refractive index difference of approximately 0.05.

10. A method of providing chromatic dispersion using Bragg reflection in polarisation maintaining optical waveguide, which method includes the steps of, separating an input optical signal into orthogonally polarised components, causing each separated component to make a forward passage through a non-reciprocal element, causing each component to suffer spatially distributed reflection as the result of being launched into an associated one of a pair of matching polarisation maintaining optical waveguides provided with matching chirped Bragg reflection gratings, each of said waveguides having waveguide, fast and slow orthogonal axes, the fast and waveguide axes defining a first principal polarisation plane of the waveguide, and the slow and waveguide axes defining a second principal polarisation plane, wherein the two components are launched into their associated waveguides with polarisation states substantially aligned with the same one of the two respective principal polarisation planes, causing each reflected component to make a return passage through the non-reciprocal element, and then recombining the two components.

11. An optical device exhibiting chromatic dispersion, which device includes a 4-port polarisation beam-splitter optically coupled, via a non-reciprocal element, with a matched pair of polarisation maintaining optical waveguides provided with matching chirped Bragg reflection gratings, each of said waveguides having waveguide, fast and slow orthogonal axes, the fast and waveguides axes defining a first principal polarisation plane of the waveguide, and the slow and waveguide axes defining a second principal polarisation plane, wherein the polarisation beam-splitter has 1st, 2nd, 3rd and 4th ports and is coupled with the polarisation maintaining waveguides such that light launched into the polarisation beam-splitter via its 1st port is resolved into orthogonally polarised components emerging respectively from the 2nd and 3rd ports to be launched, after propagation through the non-reciprocal element, into the polarisation maintaining waveguides with polarisation states substantially aligned with the first principal polarisation planes.

12. An optical device as claimed in claim 11, wherein the polarisation maintaining optical waveguides are optical fibre waveguides with a core/cladding refractive index difference of approximately 0.05.

13. An optical device as claimed in claim 11, wherein the non-reciprocal element is a Faraday rotator providing a $\pi/4$ rotation.

14. An optical device as claimed in claim 13, wherein the polarisation maintaining optical waveguides are optical fibre waveguides with a core/cladding refractive index difference of approximately 0.05.

* * * * *